US010341564B1

(12) United States Patent
Derbanne et al.

(10) Patent No.: US 10,341,564 B1
(45) Date of Patent: *Jul. 2, 2019

(54) SYSTEMS AND METHODS FOR STABILIZING VIDEOS

(71) Applicant: GoPro, Inc., San Mateo, CA (US)

(72) Inventors: Thomas Derbanne, Paris (FR); Cesar Douady, Les Molieres (FR); Maxim Karpushin, Paris (FR)

(73) Assignee: GoPro, Inc., San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/150,066

(22) Filed: Oct. 2, 2018

Related U.S. Application Data

(63) Continuation of application No. 15/987,786, filed on May 23, 2018.

(60) Provisional application No. 62/673,388, filed on May 18, 2018.

(51) Int. Cl.
H04N 5/232 (2006.01)
H04N 5/225 (2006.01)

(52) U.S. Cl.
CPC ..... *H04N 5/23258* (2013.01); *H04N 5/23267* (2013.01); *H04N 5/2252* (2013.01)

(58) Field of Classification Search
CPC .................................................. H04N 5/23267
See application file for complete search history.

(56) References Cited

U.S. PATENT DOCUMENTS 6,654,019 B2   11/2003  Gilbert
8,022,948 B2    9/2011  Garbow
8,237,787 B2 *  8/2012  Hollinger ............. H04N 5/2252
                                                348/151
9,144,714 B2 *  9/2015  Hollinger ............. H04N 5/2252
9,279,983 B1 *  3/2016  Davis .................... G02B 27/01
9,363,569 B1    6/2016  Van Hoff (Continued)

FOREIGN PATENT DOCUMENTS

WO   2009047572 A1   4/2009
WO   2014090277 A1   6/2014

OTHER PUBLICATIONS

Kopf et al., "First-person Hyper-Lapse Videos" ACM Transactions on Graphics (Proceedings of SIGGRAPH 2014), 33(4), Article No. 78, 2014 (10 pages).

(Continued)

*Primary Examiner* — Cynthia Segura
(74) *Attorney, Agent, or Firm* — Esplin & Associates, PC

(57) ABSTRACT

Images with an optical field of view are captured by an image capture device. An observed trajectory of the image capture device reflects the positions of the image capture device at different moments may be determined. A capture trajectory of the image capture device reflects virtual positions of the image capture device from which video content may be generated. The capture trajectory is determined based on a subsequent portion of the observed trajectory such that a portion of the capture trajectory corresponding to a portion of the observed trajectory is determined based on a subsequent portion of the observed trajectory. Orientations of punch-outs for the images are determined based on the capture trajectory. Video content is generated based on visual content of the images within the punch-outs.

20 Claims, 8 Drawing Sheets

(56) References Cited

U.S. PATENT DOCUMENTS

| | | | |
|---|---|---|---|
| 9,374,532 B2* | 6/2016 | Grundmann | H04N 5/2329 |
| 9,426,430 B2* | 8/2016 | Aguilar | H04N 7/183 |
| 2003/0160862 A1 | 8/2003 | Charlier | |
| 2003/0210327 A1 | 11/2003 | Mory | |
| 2004/0010804 A1 | 1/2004 | Hendricks | |
| 2004/0125133 A1 | 7/2004 | Pea | |
| 2006/0291841 A1* | 12/2006 | Fukumoto | G03B 5/00 396/55 |
| 2009/0278917 A1 | 11/2009 | Dobbins | |
| 2010/0277617 A1* | 11/2010 | Hollinger | H04N 5/2252 348/231.99 |
| 2010/0281375 A1 | 11/2010 | Pendergast | |
| 2010/0299630 A1 | 11/2010 | McCutchen | |
| 2011/0013778 A1 | 1/2011 | Takumai | |
| 2012/0206565 A1 | 8/2012 | Villmer | |
| 2013/0058535 A1 | 3/2013 | Othmezouri | |
| 2013/0177168 A1 | 7/2013 | Inha | |
| 2013/0210563 A1* | 8/2013 | Hollinger | H04N 5/2252 473/570 |
| 2013/0250047 A1* | 9/2013 | Hollinger | H04N 5/2252 348/36 |
| 2014/0039884 A1 | 2/2014 | Chen | |
| 2014/0266773 A1* | 9/2014 | Aguilar | H04Q 9/00 340/870.01 |
| 2014/0267586 A1* | 9/2014 | Aguilar | H04N 5/23238 348/36 |
| 2016/0360109 A1 | 12/2016 | Laroia | |
| 2017/0084086 A1 | 3/2017 | Pio | |
| 2017/0085964 A1 | 3/2017 | Chen | |
| 2017/0289454 A1* | 10/2017 | Pettersson | H04N 5/23267 |
| 2018/0324358 A1* | 11/2018 | Yamada | G03B 5/00 |

OTHER PUBLICATIONS

PCT International Search Report and Written Opinion for PCT/US15/38913, dated Sep. 29, 2015, 15 Pages.

O'Donovan, A., et al., "Audio-Visual Panoramas and Spherical Audio Analysis using the Audio Camera," C1 Proceedings of the 16th International Conference on Auditory Display, Jun. 9-15, 2010, pp. ICAD-167-168, can be retrieved at <URL: https://smartech.gatech.edu/bitstream/handle/1853/49858/0%27DonovanDuraiswami201 O.pdf?sequence=1 >.

O'Donovan, A., et al., "Real Time Capture of Audio Images and their Use with Video," 2007 IEEE Workshop on Applications of Signal Processing to Audio and Acoustics, Oct. 21-24, 2007, pp. 10-13.

"Spatial Audio Lecture Series," Regents of the University of California at Berkeley, Center for New Music and Audio Technologies, 2015, 1 Page, [online] [retrieved on Aug. 20, 2015] Retrieved from the internet <URL:http:I/cnmat.berkelev.edu/spatialaudiolectures>.

United States Office Action, U.S. Appl. No. 14/789,706, dated Jun. 7, 2016, ten pages.

Kamali et al., "Stabilizing Omnidirectional Videos Using 3D Structure and Spherical Image Warping", MVA2011 IAPR Conference on Machine Vision Applications, Jun. 13-15, 2011, Nara, Japan, pp. 177-180. (Year: 2011).

* cited by examiner

SYSTEMS AND METHODS FOR STABILIZING VIDEOS

FIELD

This disclosure relates to stabilizing videos using positions of an image capture device during a capture duration.

BACKGROUND

A video may have been captured by an image capture device in motion. The motion of the image capture device during the capture of the video may cause the video to appear jerky/shaky.

SUMMARY

This disclosure relates to stabilizing videos. Images with an optical field of view may be captured by an image capture device during a capture duration. Image information defining the images, position information characterizing positions of the image capture device at different moments within the capture duration, and/or other information may be obtained during the capture duration. An observed trajectory of the image capture device during the capture duration may be determined based on the position information and/or other information. The observed trajectory may reflect the positions of the image capture device at different moments within the capture duration. The observed trajectory may include a first portion corresponding to a first moment within the capture duration and a second portion corresponding to a second moment subsequent to the first moment within the capture duration. A capture trajectory of the image capture device may be determined based on a subsequent portion of the observed trajectory and/or other information such that a portion of the capture trajectory corresponding to the first portion of the observed trajectory may be determined based on the second portion of the observed trajectory. The capture trajectory may have smoother changes in the positions of the image capture device than the observed trajectory. Orientations of the capture field of view for the images with respect to the optical field of view of the images may be determined based on the capture trajectory of the image capture device and/or other information. Video content may be generated based on visual content of the images within the capture field of view and/or other information.

A system that stabilizes videos may include one or more electronic storages, one or more processors, and/or other components. An electronic storage may store image information, position information, information relating to an observed trajectory of an image capture device, information relating to a capture trajectory, information relating to an optical field of view, information relating to a capture field of view, information relating to video content, and/or other information. In some implementations, the system may include one or more image sensors, one or more position sensors, and/or other components.

One or more components of the system may be carried by a housing, such as a housing of an image capture device. For example, the image sensor(s) and the position sensor(s) of the system may be carried by the housing. The housing may carry other components, such as the processor(s) and/or one or more optical elements. An optical element may be configured to guide light within an optical field of view to an image sensor. The optical field of view may be greater than a capture field of view for generating video content. An image sensor may be configured to generate an image output signal based on light that becomes incident thereon during a capture duration. The image output signal may convey image information that defines images with the optical field of view.

A position sensor may be configured to generate a position output signal based on positions of the housing during the capture duration. The position output signal may convey position information that characterizes positions of the housing at different moments within the capture duration. In some implementations, the position sensor may include one or more of a gyroscope, an accelerometer, and/or an inertial measurement unit. The position information may be determined independent of the image information.

The processor(s) may be configured by machine-readable instructions. Executing the machine-readable instructions may cause the processor(s) to facilitate stabilizing videos. The machine-readable instructions may include one or more computer program components. The computer program components may include one or more of an observed trajectory component, a capture trajectory component, an orientation component, a generation component, and/or other computer program components.

The observed trajectory component may be configured to determine an observed trajectory of the housing during the capture duration based on the position information and/or other information. The observed trajectory may reflect positions of the housing at different moments within the capture duration. The positions of the housing may include rotational positions and/or translational positions of the housing. The observed trajectory may include a first portion corresponding to a first moment within the capture duration and a second portion corresponding to a second moment subsequent to the first moment within the capture duration.

The capture trajectory component may be configured to determine a capture trajectory of the housing based on a subsequent portion of the observed trajectory and/or other information. The capture trajectory may be determined such that a portion of the capture trajectory corresponding to the first portion of the observed trajectory is determined based on the second portion of the observed trajectory. The capture trajectory may have smoother changes in the positions of the housing than the observed trajectory.

In some implementations, the capture trajectory having smoother changes in the positions of the housing than the observed trajectory may be characterized by the capture trajectory having less jitters in the positions of the housing than the observed trajectory.

In some implementations, the capture trajectory of the housing may be determined based on minimization of a rotational velocity of the housing and a rotational acceleration of the housing while respecting a set of constraints. The set of constraints may include a margin constraint, a trajectory constraint, a target constraint, and/or other constraints. The margin constraint may be determined based on a difference between the optical field of view and the capture field of view, and/or other information. The trajectory constraint may be determined based on a subsequent portion of the observed trajectory and/or other information. The target constraint may be determined based on positions of a target in the images and/or other information.

The orientation component may be configured to determine orientations of the capture field of view for the images with respect to the optical field of view of the images based on the capture trajectory of the housing and/or other information.

The generation component may be configured to generate video content based on visual content of the images within the capture field of view and/or other information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
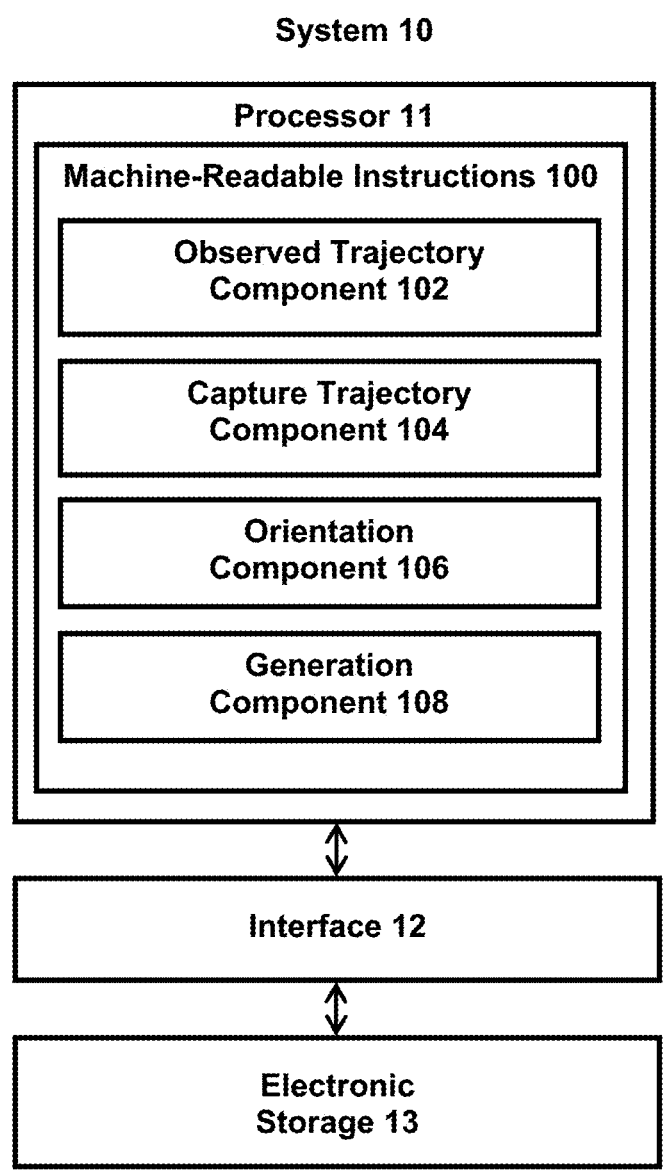
FIG. 1 illustrates a system that stabilizes videos.

FIG. 1 illustrates a system 10 for stabilizing videos. The system 10 may include one or more of a processor 11, an interface 12 (e.g., bus, wireless interface), an electronic storage 13, and/or other components. In some implementations, the system 10 may include one or more image sensors, one or more position sensors, and/or other components. Images with an optical field of view may be captured by an image capture device during a capture duration. Image information defining the images, position information characterizing positions of the image capture device at different moments within the capture duration, and/or other information may be obtained during the capture duration. Image information, position information, and/or other information may be obtained by the processor 11. An observed trajectory of the image capture device during the capture duration may be determined based on the position information and/or other information. The observed trajectory may reflect the positions of the image capture device at different moments within the capture duration. The observed trajectory may include a first portion corresponding to a first moment within the capture duration and a second portion corresponding to a second moment subsequent to the first moment within the capture duration. A capture trajectory of the image capture device may be determined based on a subsequent portion of the observed trajectory and/or other information such that a portion of the capture trajectory corresponding to the first portion of the observed trajectory may be determined based on the second portion of the observed trajectory. The capture trajectory may have smoother changes in the positions of the image capture device than the observed trajectory. Orientations of the capture field of view for the images with respect to the optical field of view of the images may be determined based on the capture trajectory of the image capture device and/or other information. Video content may be generated based on visual content of the images within the capture field of view and/or other information.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to images, image information, information relating to image capture device, information relating to optical element, information relating to image sensor, information relating to position sensor, position information, information relating to observed trajectory of the image capture device, information relating to capture trajectory of the image capture device, information relating to optical field of view, information relating to capture field of view, information relating to video content, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate stabilizing videos. The machine-readable instructions 100 may include one or more computer program components. The machine-readable instructions 100 may include one or more of an observed trajectory component 102, a capture trajectory component 104, an orientation component 106, a generation component 108, and/or other computer program components.

Images with an optical field of view may be captured by an image capture device during a capture duration. An optical field of view of image may define a field of view of a scene captured within the image. A capture duration may be measured/defined in terms of time durations and/or frame numbers. For example, images may be captured during a capture duration of 60 seconds, and/or from one point in time to another point in time. Images may be captured during a capture duration including capture of 1800 images. If the images are captured at 30 images/second, then the capture duration may correspond to 60 seconds. Other capture durations are contemplated.

The system 10 may be remote from the image capture device or local to the image capture device. One or more portions of the image capture device may be remote from or a part of the system 10. One or more portions of the system 10 may be remote from or a part of the image capture device.

For example, one or more components of the system 10 may be carried by a housing, such as a housing of an image capture device. For instance, image sensor(s) and position sensor(s) of the system 10 may be carried by the housing of the image capture device. The housing may carry other components, such as the processor 11 and/or one or more optical elements.

Figure 3:
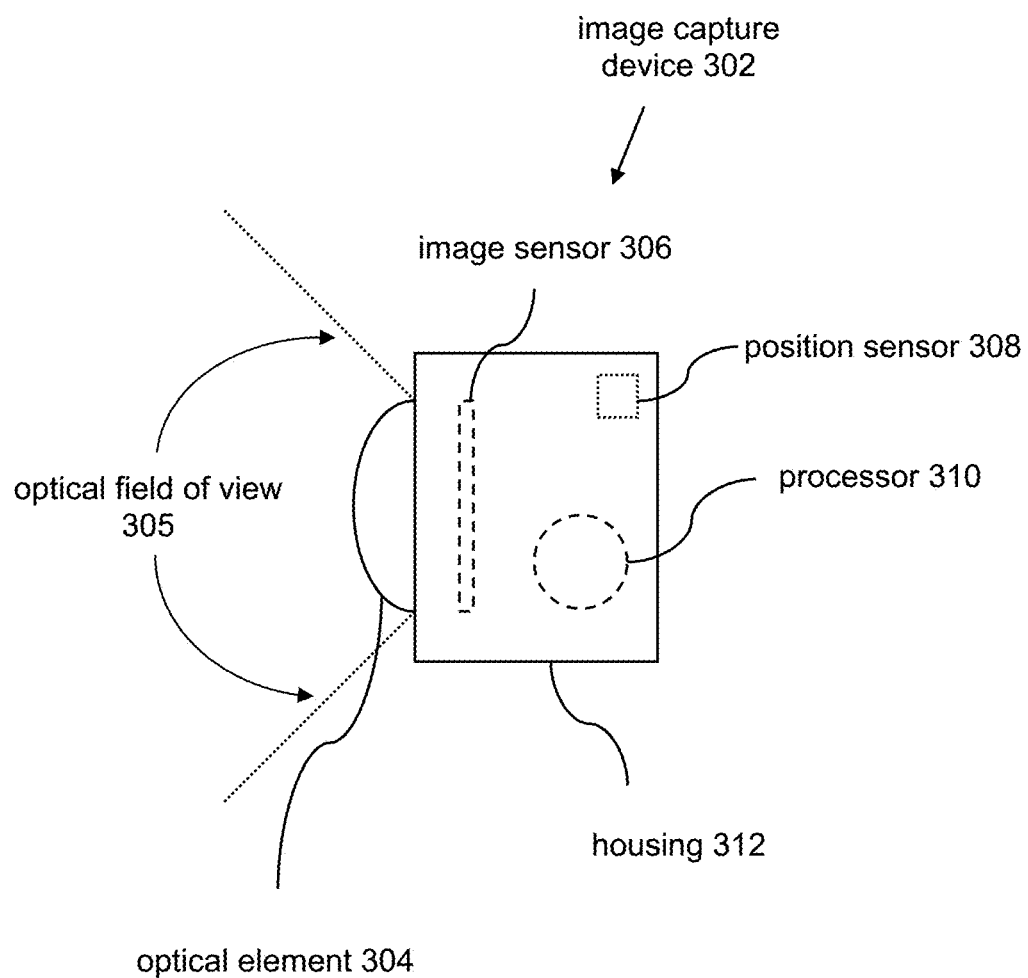
FIG. 3 illustrates an example image capture device.

An image capture device may refer to a device for recording visual information in the form of images, videos, and/or other media. An image capture device may be a standalone device (e.g., camera) or may be part of another device (e.g., part of a smartphone). FIG. 3 illustrates an example image capture device 302. The image capture device 302 may include a housing 312, and the housing 312 may carry (be attached to, support, hold, and/or otherwise carry) an optical element 304, an image sensor 306, a position sensor 308, a processor 310, and/or other components. Other configurations of image capture devices are contemplated.

The optical element 304 may include instrument(s), tool (s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may be configured to guide light within an optical field of view 305 to the image sensor 306. The optical field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The optical field of view 305 may be greater than a capture field of view for generating video content.

The image sensor 306 may include sensor(s) that converts received light into output signals. The output signals may include electrical signals. For example, the image sensor 306 may include one or more of a charge-coupled device sensor, an active pixel sensor, a complementary metal-oxide semiconductor sensor, an N-type metal-oxide-semiconductor sensor, and/or other image sensors. The image sensor 306 may generate output signals conveying information that defines one or more images (e.g., video frames of a video). For example, the image sensor 306 may be configured to generate an image output signal based on light that becomes incident thereon during a capture duration. The image output signal may convey image information that defines images with the optical field of view.

The position sensor 308 may include sensor(s) that converts experienced positions/motions into output signals. The output signals may include electrical signals. For example, the position sensor 308 may refer to a set of position sensors, which may include one or more inertial measurement units, one or more accelerometers, one or more gyroscopes, and/or other position sensors. The position sensor 308 may generate output signals conveying information that characterizes positions of the position sensor 308 and/or device(s) carrying the position sensor 308. For example, the position sensor 308 may be configured to generate a position output signal based on positions of the housing/image capture device during the capture duration. The position output signal may convey position information that characterizes positions of the housing 312 at different moments (points in time, time durations) within the capture duration. The position information may characterize positions of the housing 312 based on specific translational and/or rotational positions of the housing 312 and/or based on changes in translational and/or rotational positions of the housing 312 as a function of progress through the capture duration. That is, the position information may characterize translational and/or rotational positions of the housing 312 and/or changes in translational and/or rotational positions (motion) of the housing 312 (e.g., direction, amount, velocity, acceleration) during the capture duration.

The position information may be determined based on signals generated by the position sensor 308 and independent of the information/signals generated by the image sensor 306. That is, position information may be determined without using images/videos generated by the image sensor 306. Use of images/videos to determine positions/motions of the housing 312/image capture device 302 may be computationally expensive in terms of processing power, processing time, and/or battery consumption. Using the information/signals from the position sensor 308 to determine positions/motions of the housing 312/image capture device 302 may be computationally cheaper. That is, less processing power, processing time, and/or battery consumption may be required when positions/motions of the housing 312/image capture device 302 are determined from the information/signals from the position sensor 308 than the information/signals from the image sensor 306. The position information determined independent of the image information may be used to determine the trajectory of the housing 312/image capture device 302 during the capture duration.

The processor 310 may include one or more processors (logic circuitry) that provide information processing capabilities in the image capture device 302. The processor 310 may provide one or more computing functions for the image capture device 302. The processor 310 may operate/send command signals to one or more components of the image capture device 302 to operate the image capture device 302. For example, the processor 310 may facilitate operation of the image capture device 302 in capturing image(s) and/or video(s), facilitate operation of the optical element 304 (e.g., change how light is guided by the optical element 304), and/or facilitate operation of the image sensor 306 (e.g., change how the received light is converted into information that defines images/videos and/or how the images/videos are post-processed after capture). The processor 310 may obtain information from the image sensor 306 and/or the position sensor 308, and/or facilitate transfer of information from the image sensor 306 and/or the position sensor 308 to another device/component. The processor 310 may be remote from the processor 11 or local to the processor 11. One or more portions of the processor 310 may be part of the processor 11 and/or one or more portions of the processor 10 may be part of the processor 310.

Referring back to FIG. 1, the processor 11 (or one or more components of the processor 11) may be configured to obtain information to facilitate stabilizing videos. Obtaining information may include one or more of accessing, acquiring, analyzing, determining, examining, identifying, loading, locating, opening, receiving, retrieving, reviewing, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor, a position sensor) and/or one or more software components (e.g., software running on a computing device).

For example, the processor 11 (or one or more components of the processor 11) may obtain image information defining images with an optical field of view, position information characterizing positions of an image capture device at different moments within a capture duration, and/or other information. One or more information may be obtained during acquisition of the images and/or after acquisition of the images by an image capture device. For example, image information, position information, and/or other information may be obtained while the images are being captured by an image capture device and/or after the images have been captured and stored in memory (e.g., the electronic storage 13).

The observed trajectory component 102 may be configured to determine an observed trajectory of the image capture device/housing of the image capture device during the capture duration based on the position information and/or other information. The determination of the observed trajectory may be referred to as trajectory generation/observed trajectory generation. The observed trajectory may refer to one or more paths and/or progression followed by the image capture device/housing during the capture duration. The observed trajectory may reflect positions of the image capture device/housing of the image capture device at different moments within the capture duration. The positions of the image capture device/housing of the image capture device may include rotational positions (e.g., rotations about one or more axis of the image capture device) and/or translational positions of the image capture device/housing of the image capture device. For example, the observed trajectory component 102 may determine an observed trajectory of the image capture device/housing of the image capture device during the capture duration based on the position information characterizing specific translational and/or rotational positions of the image capture device/housing and/or changes in translational and/or rotational positions of the image capture device/housing as a function of progress through the capture duration.

The observed trajectory may include different portions corresponding to different moments within the capture duration. For example, the observed trajectory may include a first portion corresponding to a first moment within the capture duration and a second portion corresponding to a second moment within the capture duration. The second moment may be subsequent to the first moment within the capture duration.

Figure 4:
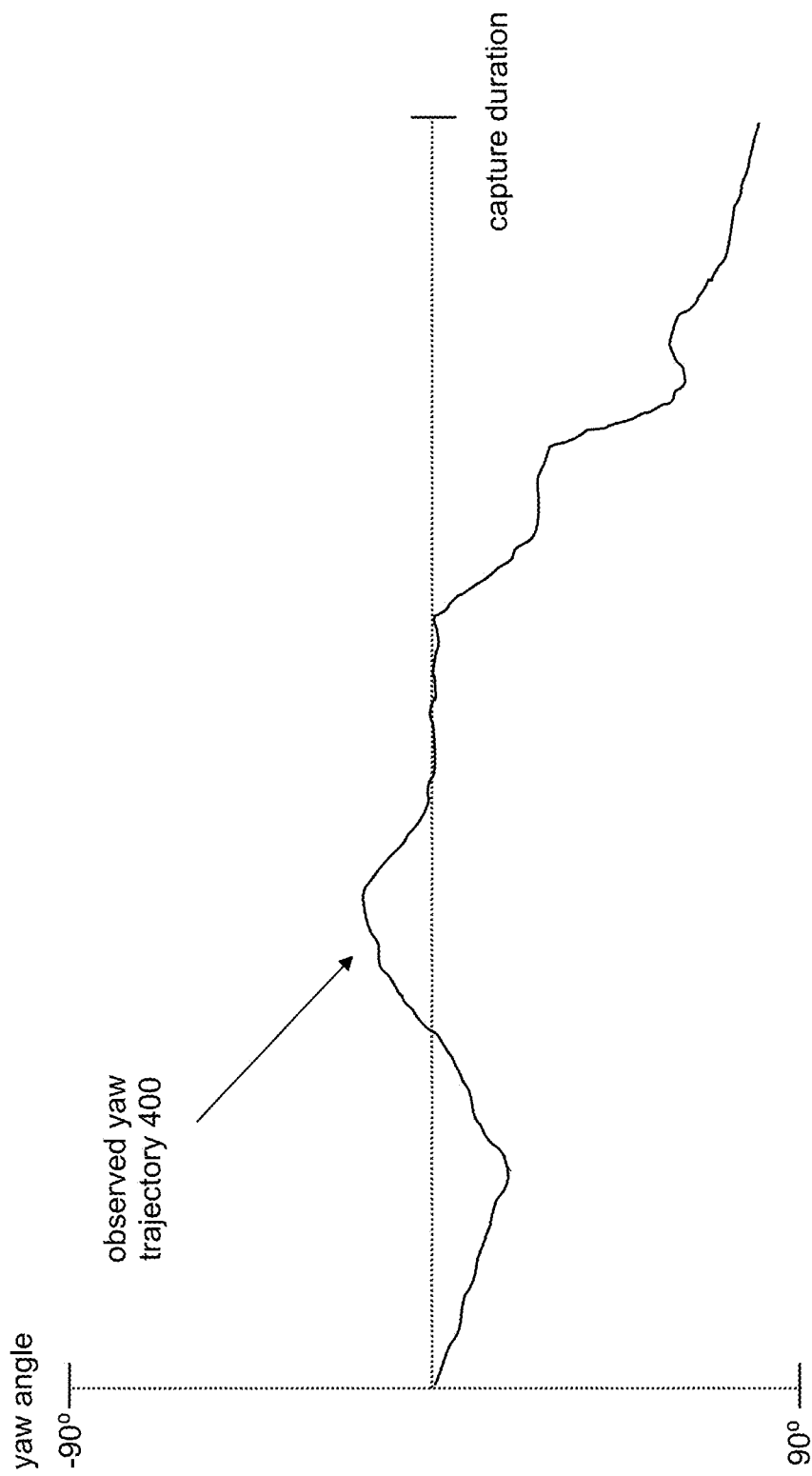
FIG. 4 illustrates an example observed trajectory.

FIG. 4 illustrates an example observed trajectory of an image capture device. The observed trajectory may include an observed yaw trajectory 400 of the image capture device. The observed yaw trajectory 400 may reflect yaw angle positions (e.g., rotational positions defined with respect to a yaw axis, rotation to the left or right) of the image capture device/housing of the image capture device at different moments within the capture duration. The observed yaw trajectory 400 may show that the image capture device was rotated in a negative yaw direction, rotated in a positive yaw direction, rotated back in the forward configuration, then rotated in the negative yaw direction. For example, the image capture device, during capture of images, may have been rotated to the right, then to the left, to the front, then to the right. Other types of observed trajectory (e.g., pitch trajectory, roll trajectory, translational trajectory) are contemplated.

Generating a video based on the images captured along the observed yaw trajectory 400 may be undesirable. For example, generating a video based on the images captured along the observed yaw trajectory 400 may result in a video with footage that is shaky and/or that appears to include unintended camera motion. For instance, sharp/quick changes in the yaw angle positions of the image capture device may result in abrupt changes in the direction of visuals within the video (e.g., quick left or right camera motion). Multiple changes in the yaw angle positions of the image capture device may result in a footage that is changing the direction of view (e.g., to the right, to the left, to the front, to the right).

Videos generated from such images may be stabilized to provide a smoother view of the captured content. Stabilization of such videos may include using smaller visual content portions of the images to provide a punch-out view of the images that creates a more stable view than when generating videos by using the entire visual content of the images. For example, such stabilization may be provided by creating a stabilized trajectory over the capture duration and determining the punch-outs from the images based on the stabilized trajectory. A punch-out of an image may refer to one or more portions of the image that is used for presentation, such as a cut-out of the image or a cropped portion of the image. A punch-out of an image may include one or more visual portions of the image presented on a display and/or one or more visual portion portions of the image used to generate video frames of video content. However, some stabilization techniques may not preserve the intent of the user that captured the images.

For example, videos may be stabilized by predicting positions/motions of the camera based on past positions/motions. For example, when attempting to determine the location and/or shape of the punch-out for an image captured at a given moment within the capture duration, the positions/motions of the image capture device preceding that moment may be used to determine how to position/shape the punch-out to create a stabilized view. Such use of "past" position/motion information may conflict with the motion intended by the user of the image capture device.

Figure 5A:
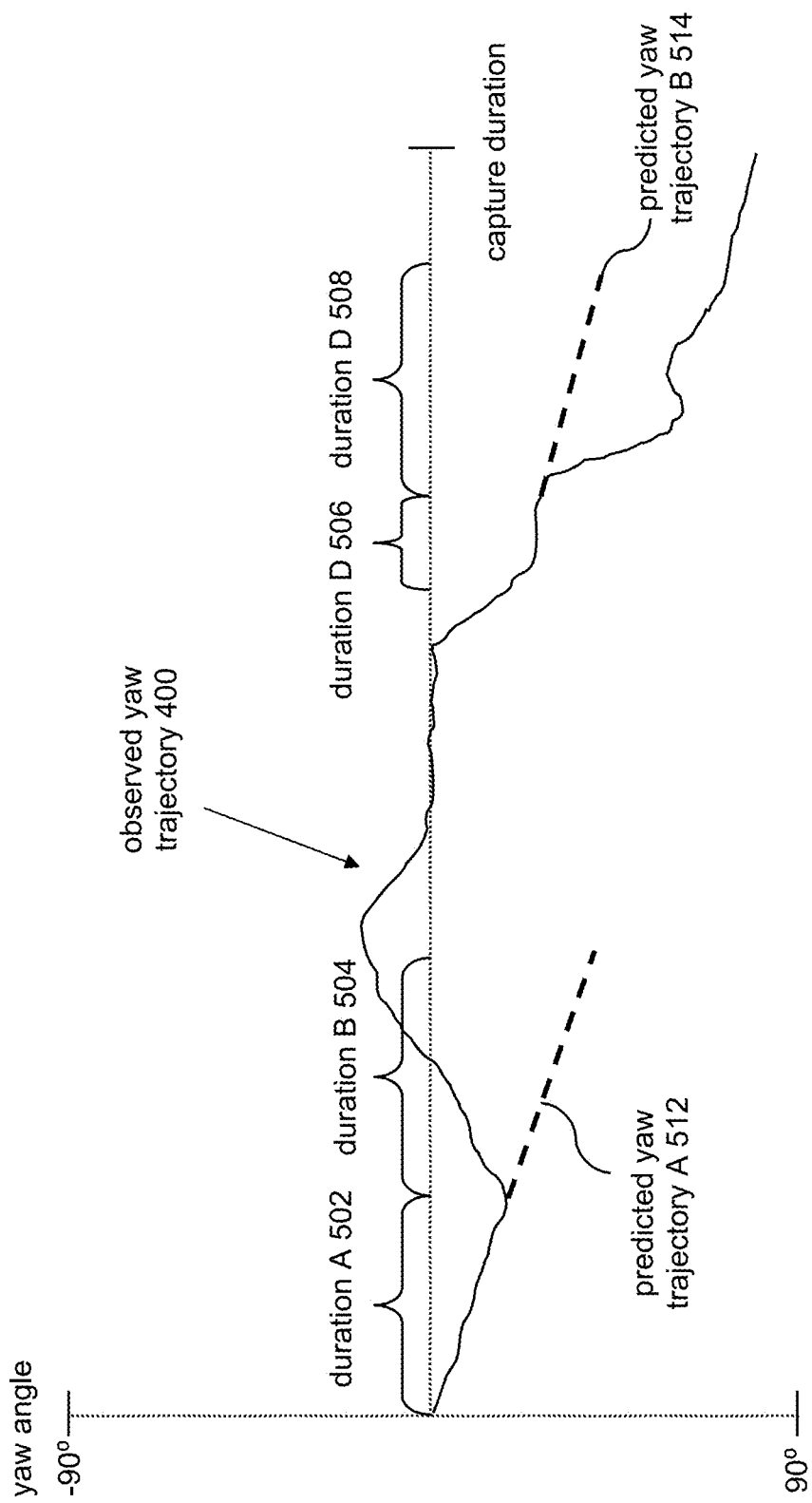
FIG. 5A illustrates example predicted trajectories.

For example, in the observed yaw trajectory 400, the rotation of the image capture device to the right, then to the left, and then to the front may be the result of the image capture device being unintentionally rotated to the right, the user overcorrecting the rotation to the left, and then rotating the image capture device to the right to a front-facing direction. Determining punch-out of the images using "past" position/motion information may result in a predicted trajectory as shown in FIG. 5A.

For example, based on the rotation of the image capture device to the right during duration A 502, a predicted yaw trajectory A 512, which continues the rotation to the right, may be predicted for duration B 504. Based on smaller rotation of the image capture device to the right during duration D 506, a predicted yaw trajectory B 514, which continues the smaller rotation to the right, may be predicted for duration D 508. The predicted yaw trajectory A 512 may be in opposite direction of the actual motion of the image capture device during duration B 504, and the predicted yaw trajectory B 514 may be off from the observed yaw trajectory by a large margin. Such discrepancy between the observed yaw trajectory and the predicted yaw trajectory may result in the images not including enough visual information (e.g., pixels) to account for the attempted stabilized and/or the punch-out location/shape.

As another example, videos may be stabilized by smoothing the observed changes in positions/motions of the image capture device. For instance, a low-pass filter may be applied to the observed trajectory to smooth out the abrupt rotational and/or translational changes in the positions/motions of the image capture device.

Figure 5B:
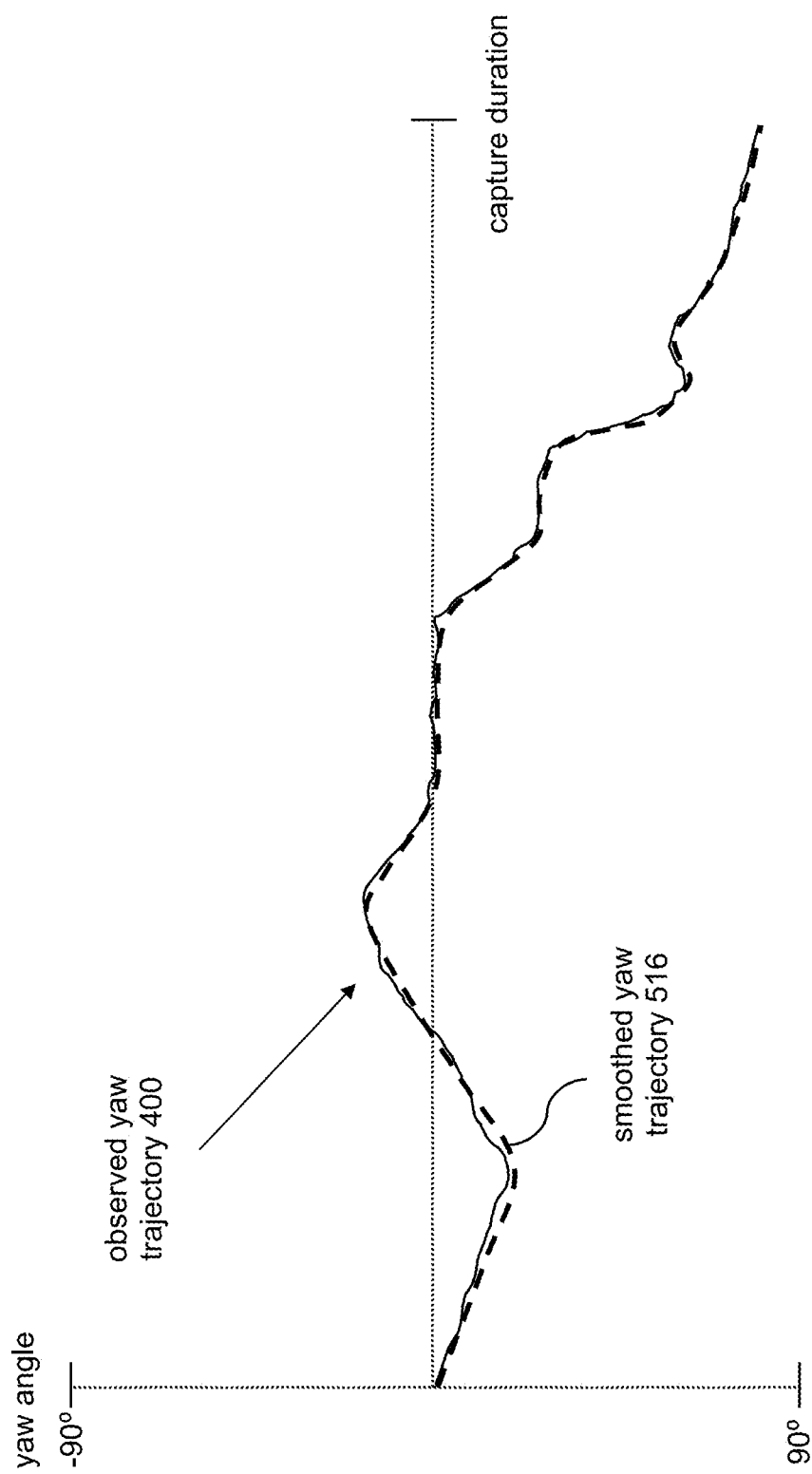
FIG. 5B illustrates an example smoothed trajectory.

For example, as shown in FIG. 5B, by applying a low-pass filter to the observed yaw trajectory 400, a smoothed yaw trajectory 516 may be determined. The smoothed yaw trajectory 516 may have smoother changes in the positions/motions of the image capture device than the observed yaw trajectory. However, such smooth may not take into account how the positions/motions changes during the capture duration and may not preserve the intent of the user that captured the images. For example, even though a video generated from the smoothed yaw trajectory 516 may not include abrupt changes in the direction of visuals within the video, the video may still include footage that is changing the direction of view to the right, then to left, to the front, and then to the right in a non-continuous motion (e.g., rotating to the right to a certain angle, holding that position for a time, then rotating to the right, then back a little to the left, and then to the right again).

The capture trajectory component 104 may be configured to determine a capture trajectory of the image capture device/housing of the image capture device based on a subsequent portion of the observed trajectory and/or other information. The determination of the capture trajectory may be referred to as trajectory generation/capture trajectory generation. The capture trajectory may refer to one or more paths and/or progression to be used in determining which portions of the visual content of the images (punch-outs) may be used to generate a video. The capture trajectory may reflect actual and/or virtual positions of the image capture device/housing of the image capture device at different moments within the capture duration. An actual position may refer to a position that was taken by the image capture device/housing of the image capture. A virtual position may refer to a position that was not taken by the image capture device/housing of the image capture. A virtual position may be offset (rotationally and/or translationally) from the actual position of the image capture device/housing of the image capture device. The capture trajectory may have smoother changes in the positions of the image capture device/housing of the image capture device than the observed trajectory. That is, the capture trajectory may have less jitters (slight irregular movement/variation), less abrupt changes, and/or less discontinuous changes in the positions of the image capture device/housing of the image capture device than the observed trajectory.

Determining a capture trajectory (capture trajectory generation) based on a subsequent portion of an observed trajectory may include determining a portion of the capture trajectory corresponding to a given moment within the capture duration based on one or more portions of the observed trajectory corresponding to one or more subsequent moments (moment(s) past the given moment) within the capture duration. That is, the capture trajectory component 104 may "look ahead" in time to determine a portion of the capture trajectory. A look ahead may include use of one or more subsequent portions of an observed trajectory to determine a preceding portion of the capture trajectory. Such generation of trajectory may be referred to as a look head trajectory generation. A subsequent moment within the duration may be adjacent to the given moment or not adjacent to the given moment. Using the subsequent portion (s) of the observed trajectory may enable the capture trajectory component 104 to determine a capture trajectory that preserves a user's intended motion for the image capture device. The user's intended motion may refer to the motion of the image capture device that the user planned/meant to carry out.

The positions/motions of the image capture device in the "future" may be analyzed (look ahead) to determine whether particular position(s)/motion(s) of the image capture device at a moment is an intended motion or an unintended motion (e.g., shaking due to vibration, rotation due to bumping/mishandling the image capture device). For example, when determining the capture trajectory for a moment (e.g., corresponding to the 1000th video frame) within the capture duration, the position(s)/motion(s) of the image capture device for a duration subsequent to the moment (e.g., corresponding to the next 30 video frames) may be analyzed to determine whether the position/motion of the image capture device at the moment was intended or not. In some implementations, the capture trajectory component 104 may determine a capture trajectory of the image capture device/housing of the image capture device further based on one or more prior portions of the observed trajectory. The past position/motion information of the image capture device may supply context for the intended motion.

Figure 5C:
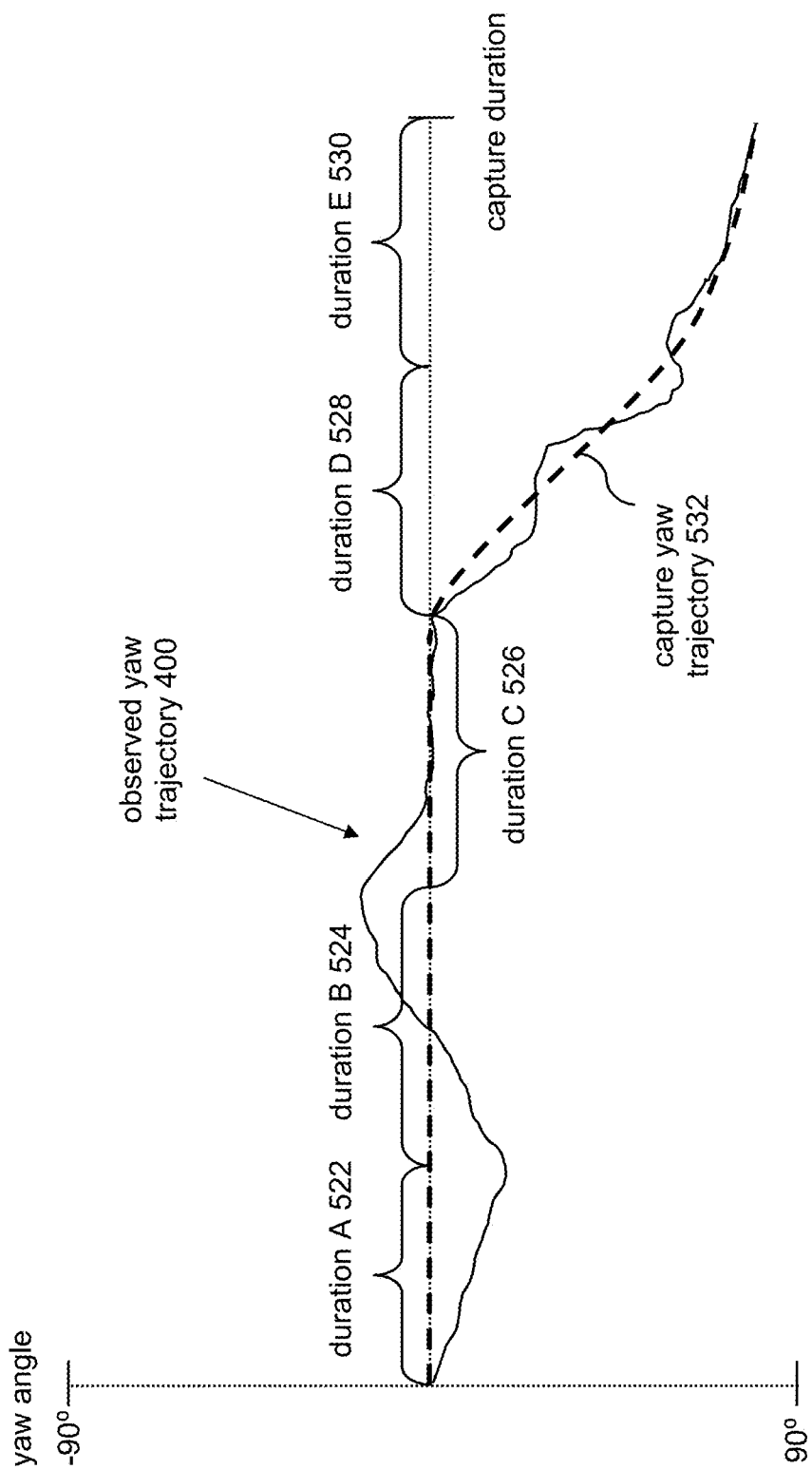
FIG. 5C illustrates an example capture trajectory.

FIG. 5C illustrates an example capture trajectory determined by the capture trajectory component 104. The capture trajectory may include a capture yaw trajectory 532. The capture yaw trajectory 532 may reflect yaw angle positions (e.g., rotational positions defined with respect to a yaw axis, rotation to the left or right) of the image capture device/housing of the image capture device to be used in determining which portions of the visual content of the images (punch-outs) may be used to generate a video. For example, the capture yaw trajectory 532 may include a zero-rotation about the yaw axis (front-direction) for durations 522, 524, 526 and then a smooth rotation to the right for durations 528, 530. Other types of capture trajectory (e.g., capture pitch trajectory, capture roll trajectory, capture translational trajectory) are contemplated.

The capture yaw trajectory 532 may be determined such that a portion of the capture yaw trajectory 532 corresponding to the portion of the observed yaw trajectory 400 is determined based on a subsequent portion of the observed yaw trajectory 400. For example, the portion of the capture yaw trajectory 532 for one or more portions of the duration A 522 may be determined based on the portion(s) of the observed yaw trajectory 400 within the duration B 524 and/or the duration C 526 (look ahead to the duration B 524 and/or the duration C 526). The portion(s) of the observed yaw trajectory 400 for the duration B 524 and/or the duration C 526 may be used to determine in what direction and/or by what amount the capture yaw trajectory 532 for portion(s) of the duration A 522 may differ from the observed yaw trajectory 400. The capture yaw trajectory 532 may be determined based on subsequent portion(s) of the observed trajectory 400 such that the capture yaw trajectory 532 preserves a user's intended motion for the image capture device. For example, based on the subsequent portion(s) (look ahead) of the observed trajectory 400, the capture trajectory component 104 may determine that the rotation of the image capture device to the right and left during durations 522, 524 were unintended motions (e.g., the image capture device being unintentionally rotated to the right and the user overcorrecting the rotation to the left), and may determine the capture yaw trajectory 532 to be directed to the front during durations 522, 524. Based on the subsequent portion(s) (look ahead) of the observed trajectory 400, the capture trajectory component 104 may determine that the staggered rotation of the image capture device to the right during durations 528, 530 included unintended motions (non-continuous rotation to the right), and may determine the capture yaw trajectory 532 to include continuous rotation to the right during durations 528, 530. Other determinations of capture trajectory are contemplated.

In some implementations, the capture trajectory may be determined based on minimization of a rotational velocity of the image capture device/housing of the image capture device and a rotational acceleration of the image capture device/housing of the image capture device while respecting a set of constraints. For example, the capture trajectory may be determined by generating a smooth path that respects the set of constraints, rather than by modifying the observed trajectory. For instance, a smooth path defining yaw angle position, pitch angle position, and/or roll angle position may be generated by finding a path of the image capture device/ housing of the image capture device that minimizes a combination of a time derivative, a second time derivative, and/or other time derivative(s) of the yaw angle position, pitch angle position, and/or roll angle position while respecting the set of constraints:

$$\min\left(\left\|\frac{d}{dt}\theta\right\|^2 + \left\|\frac{d^2}{dt^2}\theta\right\|^2 + \ldots\right) \quad (54)$$

In some implementations, one or more of the portions of the minimization calculation may be changed. For example, one or more portions of the minimization calculation (e.g., the first time derivative) may be changed to have a greater affect or a lesser affect than other portion(s) of the minimization calculation (e.g., the second time derivative), and/or other factors may be introduced into the calculation.

In some implementations, information on high frequencies (jitters) of image capture may be used to improve visual characteristics of generated video content. Certain portion of high frequencies in the input may be kept based on the image capture configuration, such as exposure start time and exposure duration time, the position information (e.g., position sensor readings), and/or other information. For example, motion of the image capture device/image sensor during a frame exposure may be analyzed and used to generate/ modify a capture trajectory that minimizes inter-frame motion (e.g., smooths inter-frame motion) while preserving the intra-frame motion, which may contain the high frequencies. This may provide for improved visual characteristics of the generated video content, such as by compensating for motion blur and/or lowlight image capture conditions.

For example, image capture may not happen instantaneously. Rather, it may take a certain amount of time for image sensor pixel sites to gather light. This may lead to splitting of the image sensor motion in time in two phases: inter-frame motion which may not be captured and may be suppressed, and intra-frame motion which may be "encrusted" in the image and may not be removed. Better visual characteristics (e.g., impression) may be provided when the intra-frame motion is taken into account so that the capture trajectory is smooth for inter-frame phases while corresponding to the original motion for intra-frame phases. That is, the capture trajectory may move/follow in the same direction and with the same speed as during the frame exposure phase, so that its motion is aligned with the motion blur in the image.

The set of constraints may include one or more constraints that provide limitations/restrictions/rules on how the smooth path is generated. For example, the set of constraints may include a margin constraint that provide limitation(s)/restriction(s)/rule(s) on how far from the observed trajectory the smooth path may be generated. The margin constraint may be determined based on a difference between the optical field of view and the capture field of view, and/or other information. The optical field of view may refer to the field of view of a scene captured within the image. That is, the optical field of view may refer to the spatial extent/angle of the scene captured within the image. The capture field of view may refer to the field of view used to generate a video based on visual content of the images. That is, a video may be generated based on visual content of the images within the capture field of view. The capture field of view may be defined in terms of shape and/or size.

Figure 6A:
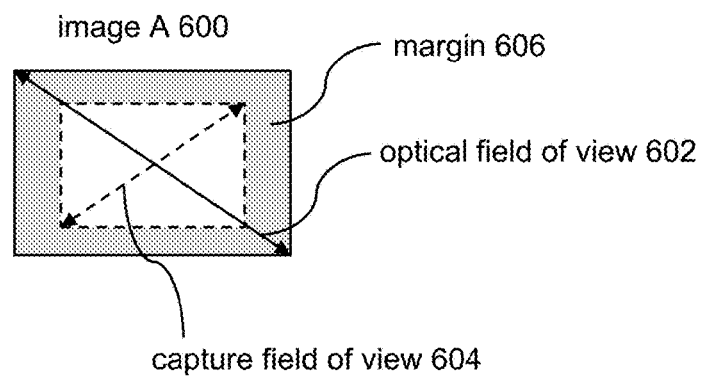
FIG. 6A illustrates example optical field of view and capture field of view.

For example, FIG. 6A illustrates an example optical field of view 602 and an example capture field of view 604 for an image A 600. The image A 600 may include capture of a scene within an angle defined by the optical field of view 602. The capture field of view 604 may provide a punch-out of the image A 600 to be used for video generation. The amount and/or direction from which the smooth path may deviate from the observed trajectory may depend on the difference between the optical field of view 602 and the capture field of view 604. The difference between the optical field of view 602 and the capture field of view 604 (e.g., 10%) may define a margin 606 within which the capture field of view 604 may move with respect to the optical field of view 602. For example, referring to FIG. 6B, a capture field of view 614 may be rotated with respect to the optical field of view 612 while not going beyond the pixels captured within an image B 610, and a capture field of view 624 may be laterally moved with respect to a optical field of view 622 while not going beyond the pixels captured within an image C 620.

Larger difference between the optical field of view 602 and the capture field of view 604 may enable larger movement of the capture field of view 604 with respect to the optical field of view 602 while smaller difference between the optical field of view 602 and the capture field of view 604 may enable smaller movement of the capture field of view 604 with respect to the optical field of view 602. However, the larger margin 606 may result in waste of pixel space and computing resources (e.g., processor power and/ or battery consumption to capture images with larger optical field of view than needed to generate a video).

In some implementations, the set of constraints may include a trajectory constraint that provide limitation(s)/ restriction(s)/rule(s) on how the smooth path may be generated based on subsequent portions of the observed trajectory. The trajectory constraint may be determined based on a subsequent portion of the observed trajectory and/or other information. That is, the trajectory constraint may include one or more constraints relating to shape of the observed trajectory in the "future." The trajectory constraint may preserve the intended motion for the image capture device in the generated path.

In some implementations, the set of constraints may include a target constraint that provide limitation(s)/restriction(s)/rule(s) on how the smooth path may be generated based on a target within the images. A target may refer to a person, an object, and/or a thing that may be selected for inclusion in a video. For example, the images captured by the image capture device may include one or more view of a person (e.g., a person of interest) and a user may wish to create a video that includes the person. The target constraint may include one or more constraints relating to the location of the target within the images such that the images are stabilized around the location of the target within the images. That is, the target constraint may affect the generation of the smooth path so that the target is within one or more of the punch-outs for the images. Other constraints are contemplated.

The orientation component 106 may be configured to determine orientations of the capture field of view for the images with respect to the optical field of view of the images based on the capture trajectory of the image capture device/ housing of the image capture device and/or other information. The orientations of the capture field of view for the images with respect to the optical field of view of the images may determine which portions of the visual content of the images (punch-outs) may be used to generate a video. That is, the orientation component 106 may determine how the punch-outs for the images may be oriented with respect to the capture field of view for the images. The capture trajectory may be used to determine how much and in what direction the capture field of view is rotated with respect to the optical field of view. In some implementations, the orientation component 106 may determine how the punch-outs for the images may be laterally and/or vertically positioned with respect to the capture field of view for the images. The capture trajectory may determine how much and in what direction the capture field of view is rotated with respect to the optical field of view. The capture trajectory may be used to determine how much and in what direction the capture field of view is laterally/vertically positioned with respect to the optical field of view.

Figure 6B:
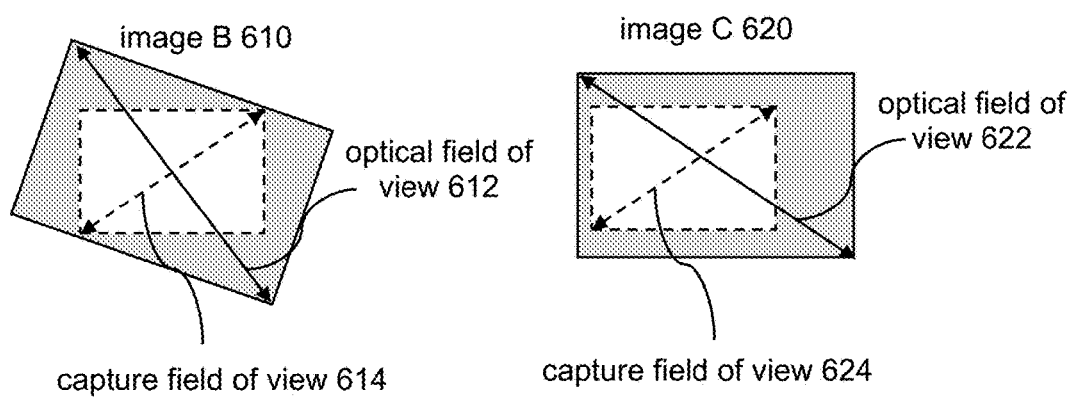
FIG. 6B illustrates example orientations of a capture field of view with respect to an optical field of view.

For example, referring to FIG. 6B, the orientation component 106 may determine the orientation of the capture field of view 614 with respect to the optical field of view 612 for the image B 610 based on the capture trajectory at a particular moment. The capture field of view 614 may be oriented with respect to the optical field of view 612 to provide a punch-out of the image B 610 that is stable with respect to a prior and/or next punch-out of the images (e.g., stable with the punch-out of the image A 600 using the capture field of view 604 for the image A 600, shown in FIG. 6A). The orientation component 106 may determine the orientation of the capture field of view 624 with respect to the optical field of view 622 for the image C 620 based on the capture trajectory at a particular moment. The capture field of view 624 may be oriented with respect to the optical field of view 622 to provide a punch-out of the image C 620 that is stable with respect to a prior and/or next punch-out of the images (e.g., stable with the punch-out of the image B 610 using the capture field of view 614 for the image B 610).

The generation component 108 may be configured to generate video content based on visual content of the images within the capture field of view and/or other information. Video content may refer media content that may be consumed as one or more videos/video clips. Video content may include one or more videos/video clips stored in one or more formats/containers, and/or other video content. A format may refer to one or more ways in which the information defining video content is arranged/laid out (e.g., file format). A container may refer to one or more ways in which information defining video content is arranged/laid out in association with other information (e.g., wrapper format). Video content may define visual content viewable as a function of progress through a progress length of the video content. Video content may include video frames that define visual content. That is, visual content of the video content may be included within video frames of the video content.

The video frames of the video content may be determined based on visual content of the images within the capture field of view and/or other information. The video frames of the video content may be determined based on a punch-out of the images in accordance with the capture trajectory, the capture field of view, and/or other information. For example, referring to FIGS. 6A-6B, the video frames of the video content may be determined based on the visual content of the image A 600 within the capture field of view 604, the visual content of the image B 610 within the capture field of view 614, the visual content of the image C 620 within the capture field of view 624, and/or other information. Such determination of visual content of images for inclusion in video content may effectuate stabilization of the video content.

In some implementations, the video frames of the video content may be determined based on warping of images (e.g., one or more portions of the visual content of the images). The warping of the images may provide for different perspectives of content captured within the images, with the different perspectives corresponding to how the content would have look had the images been captured from the image capture device on the capture trajectory.

In some implementations, one or more of the images and/or one or more of the portions of images used to generate video content may be stored in a buffer (e.g., 1s buffer). The buffer may be used to store images/portions of images including visual content that will be included in the visual content and/or images/portions of images including visual content that will be transformed (e.g., warped) for inclusion in the visual content. The buffer may be used to store image information, position information, and/or other information for look ahead and/or trajectory generation, For example, the buffer may be used to store images for which trajectory generation is being performed using look ahead. After corresponding portion of the capture trajectory is generated, the relevant portions of the images (visual content of the images within the capture field of view) in the buffer may be used to generate the video content.

The video content generated by the generation component 108 may be defined by video information. Video information defining video content may define an encoded version/copy of the video content and/or instructions for rendering the video content. For example, the video information may define an encoded version/copy of the video content, and the video information (e.g., video file) may be opened in a video player for presentation of the video content. The video information may define instructions to render the video content for presentation. For example, the video information may define a director track that includes information as to which visual portions of the images should be included within the presentation of the video content. The director track may include information on the location and/or shape of the punch-out of images to be used to as a function progress through the video content to provide a stabilized view of the images. A video player may use the director track to retrieve the relevant visual portions of the images when the video content is opened/to be presented.

The generation component 108 may be configured effectuate storage of the video information and/or other information in one or more storage media. For example, the video information may be stored in the electronic storage 13, remote storage locations (storage media located at/accessible through a server), and/or other locations. In some implementations, the generation component 108 may effectuate storage of the video information through one or more intermediary devices. For example, the processor 11 may be located within a computing device without a connection to the storage device (e.g., the computing device lacks WiFi/cellular connection to the storage device). The generation component 108 may effectuate storage of the video information through another device that has the necessary connection (e.g., the computing device using a WiFi/cellular connection of a paired mobile device, such as a smartphone, tablet, laptop, to store information in one or more storage media). Other storage locations for and storage of the video information are contemplated.

While the description herein may be directed to images and videos, one or more other implementations of the system/method described herein may be configured for other types media content. Other types of media content may include one or more of audio content (e.g., music, podcasts, audiobooks, and/or other audio content), multimedia presentations, images, slideshows, visual content (e.g., one or more images and/or videos), and/or other media content.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more computer program components may be located remotely from the other computer program components.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
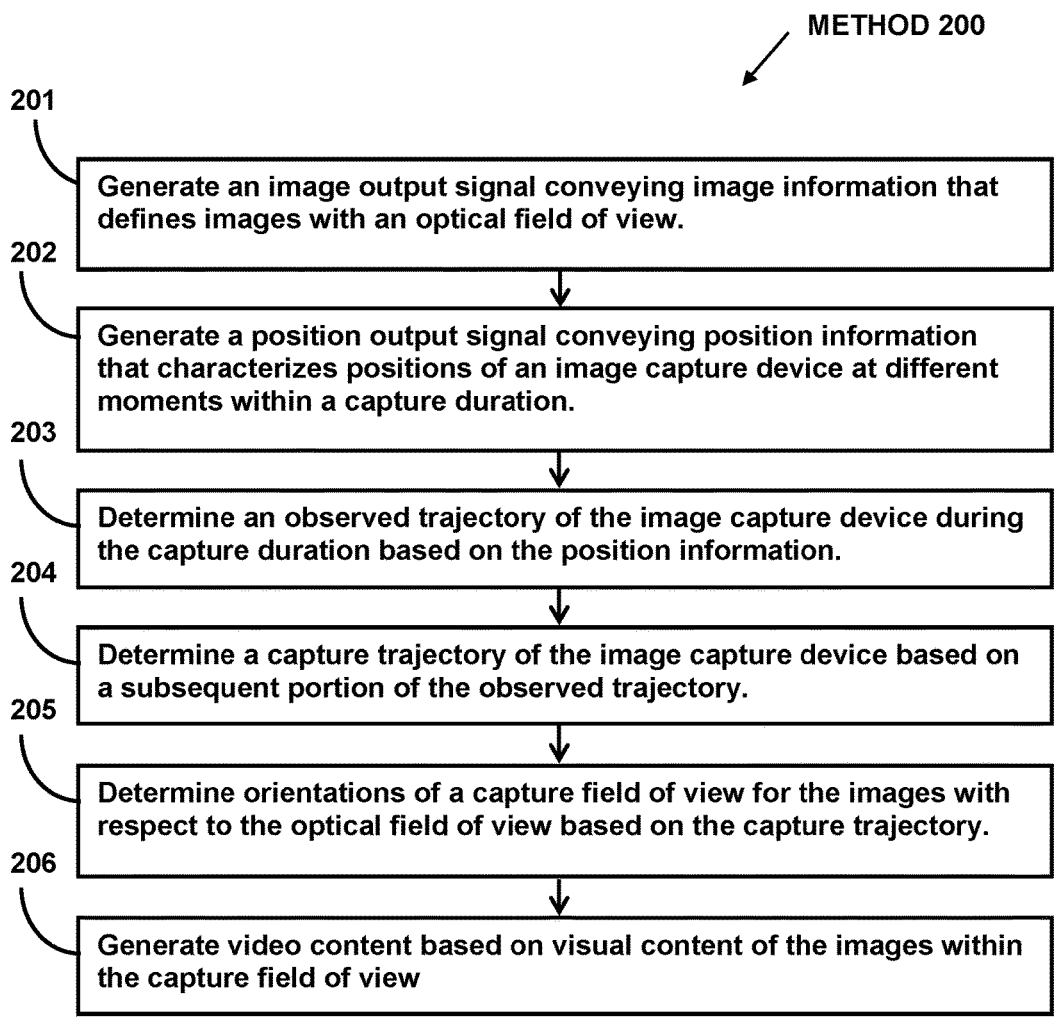
FIG. 2 illustrates a method for stabilizing videos.

FIG. 2 illustrates method 200 for stabilizing videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, an image output signal may be generated. The image output signal may convey image information that defines images with an optical field of view. In some implementation, operation 201 may be performed by a component the same as or similar to the image sensor 306 (Shown in FIG. 3 and described herein).

At operation 202, a position output signal may be generated. The position output signal may convey position information that characterizes positions of an image capture device at different moments within a capture duration. In some implementation, operation 202 may be performed by a processor component the same as or similar to the positions sensor 308 (Shown in FIG. 3 and described herein).

At operation 203, an observed trajectory of the image capture device during the capture duration may be determined based on the position information. In some implementation, operation 203 may be performed by a processor component the same as or similar to the observed trajectory component 102 (Shown in FIG. 1 and described herein).

At operation 204, a capture trajectory of the image capture device may be determined based on a subsequent portion of the observed trajectory. In some implementation, operation 204 may be performed by a processor component the same as or similar to the capture trajectory component 104 (Shown in FIG. 1 and described herein).

At operation 205, orientations of a capture field of view for the image may be determined with respect to the optical field of view based on the capture trajectory. In some implementation, operation 205 may be performed by a processor component the same as or similar to the orientation component 106 (Shown in FIG. 1 and described herein).

At operation 206, video content may be generated based on visual content of the images within the capture field of view. In some implementation, operation 206 may be performed by a processor component the same as or similar to the generation component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An image capture device that stabilizes videos, the image capture device comprising:
    a housing;
    an optical element carried by the housing and configured to guide light within an optical field of view to an image sensor, the optical field of view being greater than a capture field of view for generating video content;
    the image sensor carried by the housing and configured to generate an image output signal based on light that becomes incident thereon during a capture duration, the image output signal conveying image information that defines images with the optical field of view;
    a position sensor carried by the housing and configured to generate a position output signal based on positions of the housing during the capture duration, the position output signal conveying position information that characterizes positions of the housing at different moments within the capture duration, the characterized positions of the housing including rotational positions of the housing, the position information being conveyed by the position output signal of the position sensor independent of the image information; and
    one or more physical processors configured by machine-readable instructions to:
        determine an observed trajectory of the housing during the capture duration based on the position information, the observed trajectory reflecting the positions of the housing at the different moments within the capture duration, the observed trajectory including a first portion corresponding to a first moment within the capture duration and a second portion corresponding to a second moment subsequent to the first moment within the capture duration;
        determine a capture trajectory of the housing based on a look ahead of the observed trajectory, the capture trajectory reflecting actual and/or virtual positions of the housing from which orientations of the capture field of view are determined, the look head of the observed trajectory including use of a subsequent portion of the observed trajectory to determine a preceding portion of the capture trajectory such that a portion of the capture trajectory corresponding to the first portion of the observed trajectory, which corresponds to the first moment within the capture duration, is determined based on the second portion of the observed trajectory, which corresponds to the second moment within the capture duration, the capture trajectory having smoother changes in the positions of the housing than the observed trajectory;
        determine the orientations of the capture field of view for the images with respect to the optical field of view of the images based on the capture trajectory of the housing, the capture field of view including a smaller field of view within the optical field of view; and
        generate the video content based on a punch-out of visual content of the images within the capture field of view.

2. The image capture device of claim 1, wherein the characterized positions of the housing further include translational positions of the housing.

3. The image capture device of claim 1, wherein the position sensor includes a gyroscope, an accelerometer, and/or an inertial measurement unit.

4. The image capture device of claim 1, wherein the capture trajectory having smoother changes in the positions of the housing than the observed trajectory is characterized by the capture trajectory having less jitters in the positions of the housing than the observed trajectory.

5. The image capture device of claim 4, wherein the capture trajectory having smoother changes in the positions of the housing than the observed trajectory includes high frequency changes in the positions of the housing of the observed trajectory being removed from the capture trajectory.

6. The image capture device of claim 1, wherein the capture trajectory of the housing is determined based on minimizing a combination of a rotational velocity of the housing and a rotational acceleration of the housing while respecting a set of constraints.

7. The image capture device of claim 6, wherein the set of constraints includes a margin constraint determined based on a difference between the optical field of view and the capture field of view.

8. The image capture device of claim 7, wherein the set of constraints includes a trajectory constraint determined based on the subsequent portion of the observed trajectory.

9. The image capture device of claim 8, wherein the set of constraints includes a target constraint determined based on positions of a target in the images.

10. The image capture device of claim 1, wherein the one or more physical processors are, to generate the video content based on the punch-out of the visual content of the images within the capture field of view, further configured by machine-readable instructions to crop the visual content of the images within the capture field of view.

11. A method for stabilizing videos, the method performed by an image capture device including a housing and one or more processors, the housing carrying an optical element, an image sensor, and a position sensor, the optical element configured to guide light within an optical field of view to the image sensor, the optical field of view being greater than a capture field of view for generating video content, the method comprising:

generating, by the image sensor, an image output signal based on light that becomes incident thereon during a capture duration, the image output signal conveying image information that defines images with the optical field of view;

generating, by the position sensor, a position output signal based on positions of the housing during the capture duration, the position output signal conveying position information that characterizes positions of the housing at different moments within the capture duration, the characterized positions of the housing including rotational positions of the housing, the position information being conveyed by the position output signal of the position sensor independent of the image information;

determining, by the one or more processors, an observed trajectory of the housing during the capture duration based on the position information, the observed trajectory reflecting the positions of the housing at the different moments within the capture duration, the observed trajectory including a first portion corresponding to a first moment within the capture duration and a second portion corresponding to a second moment subsequent to the first moment within the capture duration;

determining, by the one or more processors, a capture trajectory of the housing based on a look ahead of the observed trajectory, the capture trajectory reflecting actual and/or virtual positions of the housing from which orientations of the capture field of view are determined, the look head of the observed trajectory including use of a subsequent portion of the observed trajectory to determine a preceding portion of the capture trajectory such that a portion of the capture trajectory corresponding to the first portion of the observed trajectory, which corresponds to the first moment within the capture duration, is determined based on the second portion of the observed trajectory, which corresponds to the second moment within the capture duration, the capture trajectory having smoother changes in the positions of the housing than the observed trajectory;

determining, by the one or more processors, the orientations of the capture field of view for the images with respect to the optical field of view of the images based on the capture trajectory of the housing, the capture field of view including a smaller field of view within the optical field of view; and generating, by the one or more processors, the video content based on a punch-out of visual content of the images within the capture field of view.

12. The method of claim 11, wherein the characterized positions of the housing further include translational positions of the housing.

13. The method of claim 11, wherein the position sensor includes a gyroscope, an accelerometer, and/or an inertial measurement unit.

14. The method of claim 11, wherein the capture trajectory having smoother changes in the positions of the housing than the observed trajectory is characterized by the capture trajectory having less jitters in the positions of the housing than the observed trajectory.

15. The method of claim 14, wherein the capture trajectory having smoother changes in the positions of the housing than the observed trajectory includes high frequency changes in the positions of the housing of the observed trajectory being removed from the capture trajectory.

16. The method of claim 11, wherein the capture trajectory of the housing is determined based on minimizing a combination of a rotational velocity of the housing and a rotational acceleration of the housing while respecting a set of constraints.

17. The method of claim 16, wherein the set of constraints includes a margin constraint determined based on a difference between the optical field of view and the capture field of view.

18. The method of claim 17, wherein the set of constraints includes a trajectory constraint determined based on the subsequent portion of the observed trajectory.

19. The method of claim 18, wherein the set of constraints includes a target constraint determined based on positions of a target in the images.

20. The method of claim 11, wherein generating the video content based on the punch-out of the visual content of the images within the capture field of view includes cropping the visual content of the images within the capture field of view.

* * * * *

UNITED STATES PATENT AND TRADEMARK OFFICE
CERTIFICATE OF CORRECTION

PATENT NO. : 10,341,564 B1
APPLICATION NO. : 16/150066
DATED : July 2, 2019
INVENTOR(S) : Derbanne et al.

It is certified that error appears in the above-identified patent and that said Letters Patent is hereby corrected as shown below:

In the Specification

Column 9, Line 49, please delete "head" and insert --ahead--, therefor.

In the Claims

Column 18, Line 20, please delete "head" and insert --ahead--, therefor.

Column 19, Line 50, please delete "head" and insert --ahead--, therefor.

Signed and Sealed this
Seventh Day of March, 2023

Katherine Kelly Vidal
*Director of the United States Patent and Trademark Office*